United States Patent [19]

Gannon et al.

[11] Patent Number: 4,978,685
[45] Date of Patent: Dec. 18, 1990

[54] CONTROL OF BIOFOULING IN AQUEOUS SYSTEMS BY NON-POLYMERIC QUATERNARY AMMONIUM POLYHALIDES

[75] Inventors: James E. Gannon, Cleveland, Minn.; Scott Thornburgh, West Lafayette, Ind.

[73] Assignee: Great Lakes Chemical Corporation, West Lafayette, Ind.

[21] Appl. No.: 353,912

[22] Filed: May 18, 1989

Related U.S. Application Data

[63] Continuation of Ser. No. 48,902, Apr. 20, 1987, abandoned, which is a continuation-in-part of Ser. No. 911,183, Sep. 24, 1986, abandoned.

[51] Int. Cl.$^5$ .............................................. A01N 33/12
[52] U.S. Cl. ................................. 514/642; 514/643; 71/67; 252/106
[58] Field of Search .......................... 71/67; 162/161; 210/755, 764; 252/106, 107; 422/37; 514/642, 643; 564/282, 291, 292

[56] References Cited

U.S. PATENT DOCUMENTS

| | | | |
|---|---|---|---|
| 2,666,010 | 1/1954 | Stayner | 514/642 |
| 2,692,231 | 10/1954 | Stayner et al. | 71/67 |
| 3,194,758 | 7/1965 | Lissant | 210/732 |
| 3,223,643 | 12/1965 | Law | 514/643 |
| 4,111,679 | 9/1978 | Shair et al. | 71/67 |
| 4,206,233 | 6/1980 | Quinlan | 424/329 |
| 4,336,152 | 6/1982 | Like et al. | 514/642 |
| 4,824,867 | 4/1989 | Smith et al. | 514/642 |

FOREIGN PATENT DOCUMENTS

| | | | |
|---|---|---|---|
| 214850 | 10/1987 | European Pat. Off. | |
| 898820 | 6/1962 | United Kingdom | 210/700 |
| 1346594 | 7/1974 | United Kingdom | |
| 2132087 | 7/1984 | United Kingdom | 514/643 |

*Primary Examiner*—Peter Hruskoci
*Attorney, Agent, or Firm*—Kirkland & Ellis

[57] ABSTRACT

Water soluble liquid quaternary ammonium polyhalides and quatenrary ammonium polyhalides in water soluble admixture with surfactants, and their use in the control of biofouling in aqueous systems.

3 Claims, No Drawings

CONTROL OF BIOFOULING IN AQUEOUS SYSTEMS BY NON-POLYMERIC QUATERNARY AMMONIUM POLYHALIDES

This application is a continuation of applicants' co-pending application Ser. No. 048,902, filed Apr. 20, 1987, now abandoned which was a continuation-in-part of co-pending application Ser. No. 911,183 filed Sept. 24, 1986, now abandoned.

BACKGROUND OF THE INVENTION

1. Field of the Invention

This invention relates to the use of halogens as biocides to control biofouling in aqueous systems and in particular, those systems circulating water for cooling purposes such as water cooling towers, air conditioning systems and the like.

2. Description of the Prior Art

Biocides can be divided into two basic classifications: non-oxidizing biocides and oxidizing biocides. In general, the non-oxidizing biocides function primarily by altering permeability of the cell membrane of the microorganisms and/or interfering with some essential biological processes. Common non-oxidizing biocides include organo-sulfur compounds, quaternary ammonium salts, chlorinated phenolics, heavy metal compounds and others. Non-oxidizing biocides require longer contact times than oxidizing biocides in order to work but their activity usually persists longer. They therefore provide extended antimicrobial protection.

Oxidizing biocides generally react with proteins or other oxidizable groups on or within the organism resulting in cell injury or death. Oxidizing biocides are advantageous in water systems where there is low halogen demand and when a rapid kill or reduction in the number of organisms is required or preferred. As described in U.S. Pat. No. 4,297,224 to Macchiarolo et al, a variety of compounds are known to deliver oxidizing halogen to aqueous systems. Elemental bromine and bromine chloride have been used to deliver oxidizing bromine but their high volatility, toxicity and corrosive nature represent serious handling problems. Because of these difficulties, compounds which deliver oxidizing bromine for water treatment are often N-halogenated organics, bromates or an alkali metal bromide which is oxidized in situ by an oxidizing agent such as N-chlorinated compounds, gaseous chlorine, chlorine water or hypochlorite. N-halogenated compounds are usually solids but have low water solubility. Alkali metal bromides have good water solubility but require mixing with a strong oxidizing agent in order to generate the biocidal species, HOBr.

Oxidizing bromine has been delivered to aqueous systems by passing the water to be disinfected through a polyhalide anion-exchange resin where the cationic species are quaternary ammonium groups and the anions are polyhalides in the triiodide or tribromide form. As the water containing the microorganisms is passed through the resin bed, the corresponding hypohalous acid is formed. It is the biocidal action of the hypohalous acid released into the water which provides the desired microbial control. U.S. Pat. Nos. 3,462,363; 3,817,860; 3,923,665; 4,187,183; 4,190,529; 4,298,476; 4,420,590; and 4,594,301 describe biocidal uses of a quaternary ammonium polyhalide in resin form. They describe the use of polymeric quaternary ammonium polyhalides where the quaternary ammonium functionality is insoluble in water, and only the halogen becomes dissolved in the system being treated. Since the polymeric quaternary ammonium resin functions only as a solid support on which to hold the polyhalide anion, these systems suffer from the disadvantage that the water to be treated must be physically passed through a column. Also, the polyhalides must be regenerated in an additional step for repeat use of the solid support to be cost effective. It is further known that such resin beds can be partially or completely blocked during repeated use with small particles of resin, by mechanical attrition of the original resin particles, or with accumulating particulate matter filtered from the incoming water streams. Such blockages require removing the resin bed, sieving it to remove the fine particle size contaminant, and repacking the bed—all expensive and time-consuming infringements on productive capacity. U.S. Pat. No. 4,581,058 also describes the the biocidal use of polymeric quaternary ammonium halides. Biocides have been delivered to aqueous systems in conjunction with polymeric dispersants as described in, for example, U.S. Pat. No. 4,451,376 to Sharp.

Certain quaternary ammonium monohalides are known to be effective non-oxidizing biocides, as described in German Patent DE No. 3,414,933 to Green et al. Quaternary ammonium monohalides have also been used as biocides in admixture with surfactants as described in German Patent No. 21 11 577 to Raziq et. al. Japanese Patent Publication No. 49/14,411 recognizes cetyltrimethylammonium bromide and cetylpyridinium bromide as having biocidal properties and also as starting material in the preparations of cetyltrimethylammonium tribromide and cetylpyridinium tribromide by reaction of the bromide with bromine in the presence of hydrobromic acid. The water insoluble tribromides produced are described as having biocidal properties.

In U.S. Pat. No. 3,152,073, Morton describes certain tetramethylammonium polyhalides as a water soluble compounds, solid in neat form, which can be added directly to water to achieve sterilization. Although this led Morton to recommend generally that a wide variety of tetraalkylammonium polyhalides which contain alkyl groups of six or fewer carbon atoms may be similarly used as solid, single reagents to achieve sterilization by direct addition to water, many of those recommended are not in fact sufficiently water soluble to produce useful active halogen concentrations (such as certain tetrabutylammonium polyhalides), are not in fact solids (such as certain dimethyl-propyl ammonium polyhalides) and thus are not available for use by the method disclosed. With the exception of Morton's use of the handfull of solid, water soluble tetramethylammonium polyhalides, nonpolymeric quaternary ammonium polyhalides have heretofore been unavailable in an economic, safe and efficient form as biocidal agents.

In the field of electrochemical battery systems certain unsymmetrical tetraalkylammonium salts are known to form liquids when complexed with bromine, as disclosed in United Kingdom Patent No. 2,005,064.

None of the known approaches to the control of biofouling provide a simple and economic means to deliver oxidizing halide at biocidally effective concentrations in an easily handled, liquid form. Nor do any of these approaches provide a simple and economic means to deliver oxidizing halide at biocidally effective concentrations together with non-oxidizing halide at biocidally effective concentrations and durations.

It is well recognized that aqueous systems exposed to the atmosphere provide bulk water environments in which microorganisms such as bacteria, algae, and fungi can live and reproduce. It is further known that within such environments colonies of such organisms can accumulate and grow in discrete masses or as surface deposits in which they are protected by their own metabolic products and debris, and that such accumulations may have a variety of adverse effects on the water systems and their uses. As used herein the term "biofouling" shall mean the overall effects of the existence, growth, and adverse consequences of such microorganism contaminations. As used herein the "control of biofouling" shall not mean disinfection, but rather shall mean the alleviation of said adverse consequences. It should also be noted that disinfection does not necessarily result in the control of biofouling.

It is a primary object of this invention to provide a method for controlling biofouling of aqueous systems by adding certain non-polymeric quaternary ammonium polyhalides to the aqueous systems.

It is a further object of this invention to provide quaternary ammonium polyhalide formulations which disperse, dissolve and facilitate the removal of floating and attached biofilm while simultaneously delivering active oxidizing halogen to the aqueous system.

It is a further object of this invention to provide quaternary ammonium polyhalide compounds and formulations that control biofouling by delivering both oxidizing halogen and non-oxidizing quaternary ammonium halide biocidal activity.

SUMMARY OF THE INVENTION

The present invention overcomes the disadvantages of the prior art by providing novel compounds, formulations and methods for controlling biofouling in aqueous systems.

In accordance with the method of the present invention, oxidizing halogen is delivered to the aqueous system as a quaternary ammonium polyhalide in water soluble liquid form at a frequency, duration and concentration sufficient to control biofouling.

By a preferred method, the quaternary ammonium polyhalide delivered to the system in water soluble liquid form is a quaternary ammonium polyhalide which is a liquid in neat form at ambient temperatures. Other preferred methods include the use of liquid quaternary ammonium polyhalides in water soluble admixture with surfactant, and solid quaternary ammonium polyhalides in water soluble admixture with surfactant.

Another preferred method in accordance with this invention involves delivery of oxidizing halogen in an aqueous system using a quaternary ammonium polyhalide which also functions as a non-oxidizing biocide in its reduced monohalide form to control biofouling. Providing both oxidizing and nonoxidizing biocide in a single compound or formulation is advantageous because it delivers, in a single application, the rapid control of an oxidizing biocide and the extended control of a non-oxidizing biocide.

The novel compounds of the present invention are liquid and solid quaternary ammonium polyhalides. The compositions of the present invention are surfactants in water soluble admixture with quaternary ammonium polyhalides.

DETAILED DESCRIPTION OF THE INVENTION

In accordance with the method of the present invention, quaternary ammonium polyhalides in water soluble liquid form, alone or in admixture with surfactant, are added to aqueous systems to control biofouling.

In accordance with a preferred method of the present invention, quaternary ammonium polyhalides are employed which have the general formula

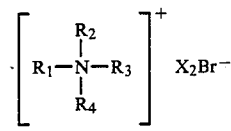

where the substituents $R_{1-4}$ are hydrogen or alkyl, alkyl ether, cyclic alkyl or cyclic alkyl ether, hydroxyethyl, polyether, or halogenated alkyl and X is chlorine, bromine, or iodine and where no more than one of the substituents $R_{1-4}$ is hydrogen. The substituents R are chosen such that the resultant polyhalide is either (1) water soluble and a liquid at ambient temperatures, or (2) a non-water soluble liquid or solid at ambient temperatures which is water soluble in a designated surfactant formulation. The substituents R and X may be varied in order to maximize the solubility of the polyhalide in water or surfactant and provide optimal efficacy in biocidal applications.

Examples of water soluble liquid quaternary ammonium polyhalides which may be employed in the method of the present invention are: N-methyl-N,N,N-tris(3,6-dioxaheptyl)ammonium dibromoiodide, N-propyl-N,N,N-tris(3,6-dioxaheptyl)ammonium tribromide, N,N,N-tris(3,6-dioxaheptyl)amine hydrotribromide, N-ethoxyethyl-N,N,N-trimethylammonium tribromide, N-(2-hydroxyethyl)-N,N,N-trimethylammonium tribromide, N,N-dimethyl-N-ethyl-N-propylammonium dichlorobromide, N,N-diethyl-N,N-dimethylammonium dichlorobromide, N,N-diethyl-N,N-dimethylammonium tribromide, N,N,N-triethylamine hydrotribromide, N,N,N-trimethylamine hydrotribromide, and mixtures thereof.

Examples of liquid quaternary ammonium polyhalides which may be employed in the method of the present invention through formulation with a surfactant to a water soluble composition are N,N-dimethyl-N-ethyl-N-propylammonium tribromide, N,N-dimethyl-N,N-dioctylammonium dibromochloride, N-methyl-N,N,N-tris(3,6-dioxaheptyl)ammonium dibromoiodide, N-propyl-N,N,N-tris(3,6-dioxaheptyl)ammonium tribromide, N,N,N-tris(3,6-dioxaheptyl)amine hydrotribromide, N,N-dimethyl-N-octylamine hydrotribromide, N,N-dimethyl-N-ethyl-N-propylammonium pentabromide, N,N-didecyl-N,N-dimethylammonium dibromochloride, N-methyl-N,N-bis(polyoxyethylene)-N-cocoammonium dibromochloride, N-methyl-N,N-bis(polyoxyethylene)-N-(9,10-dibromooctadecyl)ammonium dibromochloride, N,N-diethyl-N,N-dimethylammonium tribromide, N,N,N-tributylamine hydrotribromide, N,N,N-triethylamine hydrotribromide, and N,N,N-trimethylamine hydrotribromide.

Examples of solid quaternary ammonium polyhalides which may be employed in the method of the present invention through formulation with a surfactant to a water soluble composition are N-ethyl-N,N,N-trimethylammonium tribromide, N-ethyl-N-methylmorpholinium tribromide, N-benzyl-N,N-dimethyl-N-myristylammonium dibromochloride, N,N,N,N-tetrabutylammonium tribromide and N,N,N,N-tetrabutylammonium dibromochloride.

A preferred method of the present invention employs quaternary ammonium polyhalides which offer good oxidizing biocidal action as polyhalides and on reduction are converted to quaternary ammonium halides having non-oxidizing biocidal activity.

Examples of quaternary ammonium polyhalides, water soluble either in neat form or in admixture with surfactant, which reduce to bioactive quaternary ammonium halides are: N-methyl-N,N,N-trioctylammonium dibromochloride (liquid), N,N-didecyl-N,N-dimethylammonium dibromochloride (liquid), N,N-dioctyl-N,N-dimethylammonium dibromochloride (liquid), N-benzyl-N,N-dimethyl-N-myristylammonium dibromochloride (solid) N-methyl-N,N-bis(polyoxyethylene)-N-cocoammonium dibromochloride (liquid) and N-methyl-N,N-bis(polyoxyethylene)-N-(9,10-dibromooctadecyl)-ammonium dibromochloride (liquid).

Generally, in each of the foregoing embodiments the substituents on the quaternary ammonium cation may be varied to provide a liquid product, a solid product and/or to improve the solubility of the polyhalide in water. However, substituents having functional groups which are easily oxidized should be avoided. Functional groups which improve solubility and are sufficiently stable to avoid rapid oxidation by the polyhalide ion include ethers, alcohols, carboxylic acids, and sulfates. Water solubility of the polyhalide may also be improved by replacing one of the bromine atoms in the polyhalide with chlorine. Thus for the same quaternary ammonium cation Q+, the solubility of the polyhalide complex in water can be expected to increase in the order $Q^+Br_3^- < Q^+ClBr_2^- < Q^+Cl_2Br^-$.

Liquid polyhalide compounds may also be obtained by the bromination of a selected mixtures of two or more quaternary ammonium salts. While many polyhalides are solids in their pure form, the mixture of two or more such compounds can lower the mixture's melting point sufficiently that the mixture is a liquid at ambient temperatures.

The liquid quaternary ammonium polyhalides are made by adding molecular bromine or chlorine or bromine chloride to a concentrated aqueous solution of the appropriate quaternary ammonium halide salt. The amount of water used should be sufficient to dissolve all of the quaternary ammonium halide salt, but should be otherwise kept at a minimum to prevent yield losses due to the solubility of the product in water. The bromine should be added at a rate sufficiently slow to prevent excess bromine from pooling on the bottom of the reaction vessel during the initial stages of the reaction. The quaternary ammonium polyhalide separates from the solution as a deep red liquid layer. The temperature of the reaction should be sufficient to keep the polyhalide liquid, but below the temperature at which bromine is released from the complex. A suitable temperature range is from about 10° C. to about 90° C.

Methods for preparation of the quaternary ammonium halide salt precursors are known to those skilled in the art. The primary methods are by reaction of tertiary amine with an appropriate alkyl halide, halogenated alkyl ether, or epoxide in the presence or absence of a solvent. The reaction of tertiary amines with epoxides in aqueous media produces a quaternary ammonium hydroxide which is then neutralized with mineral acid halide. The halide ion X (H—X) to give the quaternary ammonium halide. The halide ion $X^-$ which complexes with bromine to form the polyhalide ion $XBr_2^-$ is determined in this case by the mineral acid H—X used to neutralize the reaction. If the quaternary ammonium halide salt is prepared in an aqueous solution the polyhalide may be prepared directly using the aqueous solution without isolation of the quaternary ammonium salt intermediate.

In a typical preparation, an aqueous solution of the tertiary amine is vigorously stirred with a stoichiometric amount of alkyl halide, the latter being present as a second liquid layer. The time required for complete reaction is dependent upon the nature of the alkyl halide and increases in the order R—I < R—Br < R—Cl. A sealed reaction vessel may be used to prevent loss of volatile reagents in the event that temperatures above the boiling point of the reagents are needed. The reaction is complete when the alkyl halide is consumed and is indicated by the disappearance of the second liquid layer from the reaction vessel.

The solid quaternary polyhalides can be prepared in similar fashion using intensive stirring during reaction to keep the solid products well dispersed and subsequently isolating the product from the cooled reaction mixture by filtration and drying.

The following examples, I through VII, are meant to illustrate methods of preparation of quaternary ammonium halide salts and polyhalides, and are not to be construed as limiting in scope.

EXAMPLE I

Preparation of
N,N,-dimethyl-N-ethyl-N-propylammonium tribromide

Into a 3-liter flask fitted with a condenser, a 250-ml addition funnel, a thermometer, and a mechanical stirrer were placed N,N-dimethyl-N-ethylamine (256.0 grams, 3.50 moles) and 1000 ml of water. To the stirred solution was added 1-bromopropane (430.5 grams, 3.50 mole) and the two-phase mixture heated to 50° C. with vigorous agitation. After 8.5 hours the $^1$H-NMR nuclear magnetic resonance spectrum of the upper layer indicated that the N,N-dimethyl-N-ethylamine had been completely consumed. The amber solution was cooled to room temperature, and bromine (560 grams, 3.50 moles) was added dropwise over a period of 1.5 hour with vigorous stirring. The tribromide separated as a dark red lower layer. The layers were separated and the residual water (appx. 25 grams) removed from the tribromide layer by distillation at 50° C. under reduced pressure. The yield of dark red N,N-dimethyl-N-ethyl-N-propylammonium tribromide was 1083.0 grams (87% from N,N-dimethyl-N-ethylamine). Analysis: %$Br_{tot}$=68.73% (exp), 67.35% (theo); %$Br_{ox}$=47.58% (exp), 44.90% (theo).

EXAMPLE II

Preparation of
N-(2-hydroxyethyl)-N,N,N-trimethylammonium tribromide

The reaction was run in oven-dried equipment under a nitrogen atmosphere. Into a dry 500 ml flask fitted with a magnetic stirrer, thermometer, mineral-oil bubbler, septum, and dry-ice condenser was placed 67.18 grams of 24.4% trimethylamine in methanol (277 mmoles). The amine was cooled in an ice-salt bath and ethylene oxide introduced through the septum from a tared container. The introduction of ethylene oxide was stopped after 36.35 grams (825 mmoles) had been added, and stirring continued for 5.5 hours. The reaction was then quenched by the careful addition of aqueous HBr until the solution was just acid to litmus. The reaction mixture was concentrated in vacuo to give the crude quaternary ammonium salt as a viscous yellow oil. The oil was dissolved in 60 ml of boiling isopropyl alcohol and the product crystallized by cooling to 0° C. overnight. The crystals were filtered with suction, pressed, and dried under vacuum to give 29.21 grams of dry product, melting point 280°–1° C. (dec). The bromine analysis and $^1$H-NMR spectrum were consistent with the mono-ethoxylated product, N-(2-hydroxyethyl)-N,N,N-trimethylammonium bromide, melting point 298° C. (dec). Analysis: %Br$_{tot}$=43.34% (exp), 43.41% (theo).

The recrystallized N-(2-hydroxyethyl)-N,N,N-trimethylammonium bromide (55.86 grams, 0.30 moles) was placed in a 100 ml flask fitted with a magnetic stirrer and a pressure equalizing addition funnel. Water (29 ml) was added to make a 50% solution and the solution was stirred vigorously while 48.5 grams (0.30 moles) of bromine was added dropwise from the addition funnel. The tribromide fell out of solution as a dark red oil. The product was separated from the aqueous layer by decantation and the residual water removed by warming to 50° C. at aspirator pressure for fifteen minutes. The yield of N-(2-hydroxyethyl)-N,N,N-trimethylammonium tribromide was 103.16 grams. Analysis: %Br$_{tot}$=67.63 (exp), 69.71 (theo); %Br$_{ox}$=44.10 (exp), 46.41 (theo).

EXAMPLE III

Preparation of N,N-dimethyl-N-octylamine hydrotribromide

Into a 250 ml 3-necked flask equipped with a magnetic stirrer was placed 13.49 g of 48% HBr (0.08 moles) and 60ml of water. The solution was cooled in an ice bath and dimethyloctylamine (12.58 g, 0.08 moles) added dropwise. After the last of the amine had been added (total addition time ca. 30 min) the solution was tested with litmus to assure that it was neutral or acidic, and the water then removed in vacuo. The residue was recrystalized from ethyl acetate and dried under vacuum to give the product, N,N-dimethyl-N-octylamine hydrobromide as a hygroscopic white solid, melting point 156°–158.5° C. (yield 14.01 g, 74%).

The recrystallized dimethyloctylamine hydrobromide (11.14 g, 46.8 mmoles) was placed in a 250 ml round-bottom flask and dissolved in a minimum amount of water (21 ml). Bromine (2.40 ml, 7.47 g, 46.8 mmoles) was added dropwise with vigorous stirring from a 10.0 ml buret. The product separated as a dark red oil on the bottom of the flask. The top aqueous layer was decanted and the remaining traces of water removed by warming the flask to 50° C. at aspirator pressure to give the product as a clear red oil (yield 16.47 g, 89%). %Br$_{tot}$=57.47 (calc 60.23%); %Br$_{ox}$=36.68 (calc 40.15%).

EXAMPLE IV

Preparation of N-propenyl-N,N,N-tris(3,6-dioxaheptyl)ammonium tribromide

Into a 500 ml flask fitted with a reflux condenser and a heating mantle was placed tris(3,6-dioxaheptyl)amine (14.55 g, 45 mmoles) and 150 ml acetone. Allyl bromide (6.53 g, 54 mmoles, 20% excess) was added and the solution brought to reflux. After 28 hours the $^1$H-NMR spectrum indicated that the starting amine had been consumed. Removal of the solvent in vacuo gave crude product, N-(2-propenyl)-N,N,N-tris(3,6-dioxaheptyl)ammonium bromide, as an amber oil (yield 19.66 g, 98%).

The crude product (12.00 g, 27 mmoles) was dissolved in 25 ml of ethanol and added to an atmospheric pressure hydrogenation apparatus containing 50 ml of ethanol, 25 ml glacial acetic acid, and 1.0 g of palladium on barium sulfate. The reaction was complete after stirring two hours under a hydrogen atmosphere. Removal of the solvent and acetic acid in vacuo gave the product, N-propyl-N,N,N-tris(3,6-dioxaheptyl)ammonium bromide, as an amber liquid (yield 10.97 g, 91%). A proton -NMR spectrum of the product confirmed that no unsaturations were present in the product.

The crude quaternary ammonium salt (5.36 g, 12 mmoles) was placed in a round bottom flask and bromine (0.61 ml, 1.92 g, 12 mmoles) added dropwise from a buret with vigorous stirring. The product, N-propyl-N,N,N-tris(3,6-dioxaheptyl)ammonium tribromide, was a dark red oil (yield 7.27 g, 100%). %Br$_{tot}$=39.18 (exp), 39.54 (calc); %Br$_{ox}$=20.38 (exp), 26.36 (calc).

EXAMPLE V

Preparation of N,N-dimethyl-N-ethyl-N-propylammonium dichlorobromide

Into a 125 ml flask fitted with a magnetic stirrer and a gas dispersion tube was placed N,N-dimethyl-N-ethyl-N-propylammonium bromide (19.61 g, 0.10 moles) and 20 ml of water. Chlorine gas was bubbled into the stirred solution until a total of 7.12 grams (0.10 moles) had been added. At the end of the addition the red liquid phase which accumulates on the bottom of the flask turns yellow-orange indicating the endpoint. The aqueous top phase was separated to give the product as a yellow-orange oil (yield 23.83 g, 89%); %Br$_{tot}$=32.44 (calc 29.92); %Cl$_{tot}$=27.01 (calc 26.55); oxidizing halogen=6.82 meq/g (calc 7.49 meq/g).

EXAMPLE VI

Preparation of N,N-dimethyl-N,N-dioctylammonium dibromochloride.

Into a 100 ml flask fitted with a magnetic stirrer was placed N,N-dimethyl-N,N-dioctylammonium chloride (7.65 grams, 25 mmoles). Bromine (1.28 ml, 4.00 grams, 25 mmoles) was added dropwise With vigorous stirring. The product, N,N-dimethyl-N,N-dioctylammonium dibromochloride, was an orange-red oil (yield 11.20 grams, 96%). %Br$_{tot}$=33.31 (calc 34.31); %Cl$_{tot}$=6.43 (calc 7.61); oxidizing halogen=3.25 meq/g (calc 4.29 meq/g).

EXAMPLE VII

Preparation of miscellaneous polyhalides.

The physical data for other quaternary ammonium polyhalides which have been prepared are given in Table 1. The general procedure described in Example I was followed when $X_2=Br_2$ and Example V and $X_2=Cl_2$. Compounds which do not have a melting point listed were liquids at room temperature.

TABLE 1

Physical data for quaternary ammonium polyhalides. The molecular halogen $X_2$ was added to the quaternary ammonium halide $Q^+X^-$

| COMPOUND | $X^-$ | $X_2$ | % $Br_{tot}$ exp | % $Br_{tot}$ calc | meq/g $X_{ox}$ exp | meq/g $X_{ox}$ calc | Melting Point (°C.) | Yield (%) |
|---|---|---|---|---|---|---|---|---|
| N,N-dimethyl-N,N-dioctyl-ammonium dibromochloride | Cl | $Br_2$ | 33.31 | 34.31 | 3.75 | 4.29 | liq | 96 |
| N-methyl-N,N,N-tris(3,6-dioxaheptyl)ammonium dibromoiodide | I | $Br_2$ | 26.14 | 28.56 | 3.08 | 3.20 | liq | 98 |
| N-propyl-N,N,N-tris(3,6-dioxaheptyl)ammonium tribromide | Br | $Br_2$ | 39.18 | 39.54 | 2.55 | 3.30 | liq | 100 |
| N,N,N-tris(3,6-dioxaheptyl)amine hydrotribromide | Br | $Br_2$ | 41.92 | 42.49 | 2.66 | 3.55 | liq | 100 |
| N-ethoxyethyl-N,N,N-trimethylammonium tribromide | Br | $Br_2$ | 64.47 | 64.45 | 5.16 | 5.38 | liq | 88.2 |
| N,N-dimethyl-N-octylamine hydrotribromide | Br | $Br_2$ | 57.47 | 60.23 | 4.59 | 5.03 | liq | 88.5 |
| N-(2-hydroxyethyl)-N,N,N-trimethylammonium tribromide | Br | $Br_2$ | 66.54 | 69.71 | 5.05 | 5.82 | liq | 98.7 |
| N,N-dimethyl-N-ethyl-N-propylammonium dichlorobromide | Br | $Cl_2$ | 32.44 | 29.92 | 6.82 | 7.49 | liq | 89.3 |
| N-ethyl-N,N,N-trimethyl-ammonium tribromide | Br | $Br_2$ | 73.16 | 73.11 | 6.14 | 6.10 | 48–52 | 78 |
| N-benzyl-N,N-dimethyl-N-myristylammonium dibromochloride | Cl | $Br_2$ | 29.16 | 30.28 | 3.53 | 3.79 | liq | 95.6 |
| N-ethyl-N,N,N-trimethyl-ammonium dichlorobromide | Br | $Cl_2$ | 28.57 | 33.44 | 7.02 | 8.37 | 47–57 | |
| N,N,N,N-tetramethylammonium dichlorobromide | Br | $Cl_2$ | 33.48 | 35.52 | 7.51 | 8.89 | 153–156 | 40.1 |
| N,N-diethyl-N,N-dimethyl-ammonium dichlorobromide | Br | $Cl_2$ | 35.28 | 31.58 | 7.99 | 7.91 | liq | 84 |
| N,N-didecyl-N,N-dimethyl-ammonium dibromochloride | Cl | $Br_2$ | 29.88 | 30.62 | 3.02 | 3.83 | liq | 100 |
| N-methyl-N,N-bis(polyoxyethylene)-N-cocoammonium dibromochloride | Cl | $Br_2$ | 15.17 | 14.37 | 1.23 | 1.84 | liq | 99.6 |
| N-methyl-N,N-bis(polyoxyethylene)-N-(9,10-dibromooctadecyl)-ammonium dibromochloride | Cl | $Br_2$ | 24.92 | 24.62 | 1.37 | 1.54 | liq | 93 |
| N-methyl-N,N,N-trioctyl-ammonium dibromochloride | Cl | $Br_2$ | 29.01 | 28.34 | 2.01 | 3.57 | liq | 99.3 |
| N,N,N-trimethyl-ammonium hydrotribromide | Br | $Br_2$ | 79.95 | 78.15 | 6.36 | 6.67 | liq | 77.3 |
| N,N,N-trimethyl-ammonium hydrotribromide | Br | $Br_2$ | 70.11 | 68.94 | 4.85 | 5.85 | liq | 88.3 |
| N,N,N-trimethyl-ammonium hydrotribromide | Br | $Br_2$ | 56.26 | 59.11 | 4.49 | 4.69 | liq | 102 |

In general, by the method of the present invention, quaternary ammonium polyhalide is supplied to an aqueous system in amounts sufficient to provide effective biofouling control. Depending on the nature of the system and the particular polyhalide used, successful biofouling control can be obtained by providing at least about 0.1 to 55.0 pounds of quaternary ammonium polyhalide per 100,000 gallons of water. It is especially preferred to supply such polyhalides at a level of about 1 to 20 pounds per 100,000 gallons of water. Alternatively, polyhalide is provided in such quantity as is needed to maintain an active halogen level in the system of at least about 0.05 ppm up to about 30.0 ppm, preferably at least about 1 ppm of active halogen.

The efficacy of the quaternary ammonium polyhalides used in accordance with the present invention may advantageously be enhanced by providing them in combination with one or more surfactants. As used herein the term surfactant shall mean a substance that, when present at a low concentration in a system, has the property of adsorbing onto the surfaces or interfaces of the system and of altering to a marked degree the surface or interfacial free energies of those surfaces or interfaces, where interface is a boundary between two immiscible phases and where surface is an interface where one phase is a gas, usually air. Suitable surfactants include poly(oxyethylene)/poly(oxypropylene) block copolymers (available commercially under the trade names, inter alia, "Pluronic L-62" and "Macol 1"); ethoxylated alcohols such as polyoxyethylene tridecyl alcohol (available commercially under the trade name, inter alia. "Macol TD-8"); polyethylene glycol ether of straight chain fatty alcohols (available commercially under the trade name, inter alia, "ARNOX 1007"); tridecyloxypoly(ethyleneoxy) ethanol (available commercially under the trade name, inter alia. "Emulphogene BC720") and alcohol ethoxylate (available commercially under the trade name, inter alia, "Neodol 23-6.5"); ethoxylated alkyl phenols such as nonylphenoxypoly(ethyleneoxy) ethanol (available commerically under the trade name, inter alia, "Igepal C0730"); nonylphenoxy polyethoxy ethanol (available commercially under the trade name, inter alia. "Arnox 912") and alkylphenoxy polyethylene glycol ether (available commercially under the trade names, inter alia, "Arnox 910" and "Arnox 908"); polyoxyethyleneglycerol monoisostearate (available commercially under the trade name, inter alia. "Tagat I") and ethoxylated mono/diglycerides of caprylic/capric acids (available commercially under the trade name, inter alia. "Softigen 767"); ethoxylated alkylphenols (available commercially under the trade name, inter alia, "Pluradyne OP-10"); polyethylene glycol monolaurates (available commercially under the trade names, inter alia. "Chemax E400 ML" and "Chemax E600 ML"); modified polyethoxy adducts (available commercially under the trade name inter alia. "Arnox LF12"); alkoxylated biodegradable hydrophobes (available commercially under the trade name, inter alia. "Polytergent SL42"); alkyl polyoxyalkylene ethers (available commercially under the trade name, inter alia, "Surfonic LF17"); phosphate esters available commercially under the tradename, inter alia. "Chemfac PB109") and aliphatic phosphate ester/ethylene oxide adducts (available commercially under the trade names, inter alia, "Jordaphos-JA60" and "JS41"); polyol esters (available commercially under the trade name, inter alia. "Pluradyne-DB2564"); quaternary surfactants such as alkyl polyoxyethylene ammonium chloride (available commercially under the trade names, inter alia. Tomah's "Q-18-15" and "Acid Foamer"), and coco-(polyoxyethylene) methylammonium chloride (available commercially under the trade name, inter alia. "Tomah Q-15-C").

Preferred surfactants in accordance with this invention include poly(oxyethylene)/poly(oxypropylene) block copolymer, ethoxylated alkyl phenols, phosphate esters, glycol esters, and quaternary ammonium surfactants.

It is well known in the water treatment field that quaternary ammonium surfactants such as the one sold under the trade name Acid Foamer, can cause unwanted foaming. In applications where foaming is a problem, polyhalide-surfactant formulations can include antifoaming or defoaming agents.

Where a surfactant is supplied with the quaternary ammonium polyhalide in an additive composition, the surfactant is supplied in the range of about 5 to 95 percent by weight of the composition, preferably about 40 to 95 percent by weight surfactant.

In general, the quaternary ammonium polyhalide-surfactant mixtures are introduced to aqueous systems in amounts sufficient to provide effective biofouling control. Depending on the nature of the system and on the ratio of the polyhalide to the surfactant contained in the formulation, successful biofouling control can be obtained by providing at least about 0.2 to 150 pounds of the mixture per 100,000 gallons of water, preferably at a level of about 2 to 50 pounds per 100,000 gallons of water. Alternatively, the mixture is provided in such quantity as is necessary to maintain an active halogen level in the system of at least about 0.05 ppm to about 30 ppm, preferably at least about 1 ppm of active halogen.

The proportion of quaternary ammonium polyhalide to surfactant which enhances water solubility varies with each surfactant and each polyhalide. In addition, adjusted formulations for delivering a specific amount of oxidizing halogen and/or surfactant can be made by dilution with compatible glycols, alcohols, other suitable solvents and suitable diluents. The improvement of water solubility imparted to N,N-dimethyl-N-ethyl-N-propylammonium tribromide by a selected surfactant (Pluronic L-62) is shown in Table 2.

TABLE 2

| % Tribromide | % Pluronic L-62 | Solubility (gBr$_2$/l)in 1.0 minute |
|---|---|---|
| 100 | none | 0.1 |
| 40 | 60 | 9.0 |

Examples of effective liquid quaternary ammonium polyhalide surfactant formulations are given below. These examples are provided for illustrative purposes and are not to be construed as limiting in scope.

EXAMPLE VIII

Pluronic L-62 and N,N-dimethyl-N-ethyl-N-propylammonium tribromide:

As a concentrated formulation, it is desirable to obtain the maximum oxidizing halogen content possible while maintaining complete water solubility. The useful range using L-62, or like surfactant, and N,N-dimethyl-N-ethyl-N-propylammonium tribromide is 40-80 parts L-62 and 60-20 parts tribromide. The preferred concentration is 60 parts L-62 and 40 parts tribromide. Thus a formulation of 40 grams tribromide is added to 60 grams L-62 and mixed well at room temperature. The resulting mixture can be added to the aqueous system to achieve a total active halogen level between about 0.05 ppm and 30 ppm.

EXAMPLE IX

Surfactant Q-18-15 and N,N-dimethyl-N-ethyl-N-propylammonium tribromide

The useful range is 40-95 parts surfactant to 60-25 parts tribromide. A preferred formulation is made by adding 40 grams tribromide to 60 grams Q-18-15, or like surfactant, and mixing well at room temperature. The resulting mixture can be added to the aqueous system so that a total active halogen level between about 0.05 ppm and 30 ppm is achieved.

EXAMPLE X

Chemax E-600 ML and N,N-dimethyl-N-ethyl-N-propylammonium tribromide

The useful range is 60-95 parts surfactant to 45-50 parts tribromide. A preferred formulation is made by adding 20 grams tribromide to 60 grams Chemax E-600 ML, or like surfactant. The resulting mixture can be added to the aqueous system so that an active halogen level between about 0.05 and 30 ppm is achieved.

EXAMPLE XI

Surfactant JA 60 and N,N-dimethyl-N-ethyl-N-propylammonium tribromide

The useful range is 60–80 parts JA 60, or like surfactant to 40–20 parts tribromide. A preferred formulation is made by adding 20 grams tribromide to 80 grams surfactant.

Quaternary ammonium polyhalides and surfactant mixtures thereof have biocidal properties in aqueous systems where oxidizing biocides are compatible; that is, in aqueous systems having a low halogen demand. The spectrum of activity for quaternary ammonium polyhalides such as N,N-dimethyl-N-ethyl-N-propylammonium tribromide includes bacteria, fungi, and algae as shown in Tables 3–5, respectively.

TABLE 3

| Surfactant | ppm $Br_2$ | % Kill of Pseudomonas aeruginosa | | |
|---|---|---|---|---|
| | | 0.5 min | 1.0 min | 2.0 min |
| Acid Foamer (0.1) | 0.3 | 79.6 | 93 | 100 |
| Acid Foamer (0.1) | 0.5 | 100 | 100 | 100 |
| Arnox 908 | 0.4 | 100 | 100 | 100 |
| Arnox LF 12 | 0.4 | 65.2 | 100 | 100 |
| L62 | 0.4 | 83 | 100 | 100 |
| none | 0.2 | 48 | 78.2 | 99.8 |
| none | 0.4 | 79.2 | 100 | 100 |

TABLE 4

| Surfactant | ppm $Br_2$ | % Kill Candida albicans | | | | | | |
|---|---|---|---|---|---|---|---|---|
| | | 0.5 min | 1.0 min | 2.0 min | 3.0 min | 4.0 min | 5.0 min | 10.0 min |
| Q-18-15 | 0.2 | 98.40 | 98.40 | 98.10 | 98.40 | 98.50 | 98.90 | 99.60 |
| L62 | 0.4 | 98.70 | 98.90 | 98.70 | 96.80 | 99.70 | 100.00 | 100.00 |
| Q-18-15 | 1.2 | 100.00 | 100.00 | 100.00 | 100.00 | 100.00 | 100.00 | 100.00 |
| L62 | 1.4 | 99.90 | 100.00 | 100.00 | 100.00 | 100.00 | 100.00 | 100.00 |
| None | 1.4 | 86.00 | 90.00 | 91.30 | 90.30 | 91.30 | 89.60 | 99.40 |

TABLE 5

| Surfactant | ppm $Br_2$ | % Kill Chlorella pyrendoidosa | |
|---|---|---|---|
| | | 2 days | Regrowth? |
| L62 | 1.4 | 74.0 | no |
| none | 1.6 | 59.5 | yes |
| none | 1.6 | 78.0 | yes |
| Q-18-15 | 0.5 | 85.0 | no |
| Q-18-15 | 1.1 | 83.0 | no |

The data in Tables 3–5 indicate that the combination of a water soluble liquid quaternary ammonium polyhalide and a surfactant provides an enhanced efficacy over the liquid quaternary ammonium polyhalide alone. This may be a result of the surface active effect on exopolysaccharides and/or biological membranes. The data of Table 5 indicates that the addition of surfactant to the liquid quaternary ammonium polyhalide improves algicidal activity (no regrowth) over the polyhalide alone. The data in Tables 6 and 7 for N,N-dimethyl-N-ethyl-N-propylammonium tribromide with the surfactant alkyl polyoxyethyleneammonium chloride (available commercially as "Q-18-15"), demonstrate how increased surfactant concentrations increase % kill of Pseudomonas aeruginosa and Candida albicans, respectively.

TABLE 6

| ppm surfactant | ppm $Br_2$ | % Kill of Pseudomonas aeruginosa | | | | | | |
|---|---|---|---|---|---|---|---|---|
| | | 0.5 min | 1.0 min | 2.0 min | 3.0 min | 4.0 min | 5.0 min | 10.0 min |
| 0 | 0.2 | 48 | 78.2 | 99.8 | 100 | 100 | 100 | 100 |
| 0.1 | 0.2 | 54.2 | 64.2 | 98.3 | 99.6 | 99.9 | 99.9 | 100 |
| 1 | 0.2 | 28.5 | 98.8 | 100 | 100 | 100 | 100 | 100 |
| 100 | 0.2 | 99.9 | 100 | 100 | 100 | 100 | 100 | 100 |

TABLE 7

| ppm surfactant | ppm $Br_2$ | % Kill of Candida albicans | | | | | |
|---|---|---|---|---|---|---|---|
| | | 0.5 min | 1.0 min | 2.0 min | 3.0 min | 5.0 min | 10.0 min |
| none | 0.3 | 98.4 | 98.4 | 98.4 | 98.4 | 98.3 | 98.5 |
| 0.1 | 0.2 | 98.7 | 99.0 | 98.7 | 98.8 | 98.8 | 98.9 |
| 1.0 | 0.2 | 98.3 | 99.0 | 99.1 | 99.5 | 99.9 | 100.0 |
| 10.0 | 0.2 | 99.3 | 99.8 | 99.9 | 100.0 | 100.0 | 100.0 |
| 50.0 | 0.2 | 99.4 | 99.9 | 100.0 | 100.0 | 100.0 | 100.0 |
| 100.0 | 0.2 | 100.0 | 100.0 | 100.0 | 100.0 | 100.0 | 100.0 |

Quaternary ammonium polyhalides and quaternary ammonium polyhalides in admixture with surfactant can be used in any aqueous system where oxidizing biocides are compatible, such as, for example 1. Industrial Applications
   a. Recirculating cooling water
   b. Once-through cooling water
   c. Brewery pasteurizer water
   d. Air washer system water
   e. Evaporative cooling water
   f. Air scrubber systems
   g. Humidifier systems
   h. Oilfield injection water
   i. Pond and lagoon water
   j. Degreaser disinfectants
   k. Closed cooling system water
   l. Irrigation system disinfection
   m. Metal-working system disinfection
   n. Food plant disinfection 2. Consumer Applications
   a. Toilet bowl cleaners/disinfectants
   b. Hard surface cleaners/disinfectants
   c. Air conditioning pan water d. Decorative fountain water
e. Tile and grout cleaners
f. Bleaching agent compositions
g. Dishwashing formulations
h. Laundry formulations Cooling tower water represents a major use. Table 8 demonstrates the efficacy of the quaternary ammonium polyhalide surfactant formulation given in Example IX above in a freshly collected cooling water sample with a halogen level of 5.0 ppm at pH 7.6.

TABLE 8

Bacterial Efficacy in Cooling Tower Water

| Time (min) | Percent Kill | |
|---|---|---|
| | Treated | Untreated |
| 0.5 | 99.9 | 0 |
| 3.0 | 100.0* | 0 |
| 5.0 | 100.0* | 0 |

*≦ 10 colony forming units/ml

From the foregoing it may be seen that the present invention may be performed by introducing quantities of liquid or solid quaternary ammonium polyhalide in the water, in formulation with a surfactant or without, in order to control biofouling of the system. Where a polyhalide-surfactant mixture is not shelfstable (that is, not stable at temperatures up to 120 degrees F.) then the surfactant and polyhalide may be commercialized in a two-package system, allowing the user to prepare the mixture just prior to use.

Table 9 shows biocidal efficacy for a variety of quaternary ammonium polyhalides.

TABLE 9

| | Biocidal Efficacy of Polyhalides | | | | | |
|---|---|---|---|---|---|---|
| | Compound | Free Bromine Concentration, ppm | Percent Kill Pseudomonas aeruginosa, min | | | |
| | | | 1 | 3 | 5 | 10 |
| 1. | N,N-Dimethyl-N-ethyl-N-propylammonium tribromide | 0.23 | 78.20 | 100 | 100 | 100 |
| 2. | N,N-Dimethyl-N,N-dioctylammonium dibromochloride | 0.23 | 82.00 | 100 | 100 | 100 |
| 3. | N-Methyl-N,N,N-tris(3,6-dioxaheptyl)ammonium diobromoiodide | 0.34 | 98.58 | 99.97 | 100 | 99.99 |
| 4. | N,N-Dimethyl-N-octylamine hydrotribromide | 0.34 | 99.90 | 100 | 100 | 100 |
| 5. | N-Ethyl-N,N,N-trimethylammonium tribromide | 0.34 | 99.90 | 100 | 100 | 100 |
| 6. | N,N-Dimethyl-N-ethyl-N-propylammonium pentabromide | 0.34 | 99.60 | 100 | 100 | 100 |
| 7. | N-(2-Hydroxyethyl)-N,N,N-trimethylammonium tribromide | 0.20 | 56.6 | 99.60 | 100 | 100 |
| 8. | N,N,N-tris(3,6-Dioxaheptyl)amine hydrotribromide | 0.23 | 99.90 | 100 | 100 | 100 |
| 9. | N-Propyl-N,N-tris(3,6-dioxaheptyl)-ammonium tribromide | 0.23 | 21.50 | 82.00 | 100 | 100 |
| 10. | N-Ethyl-N-methylmorpholinium tribromide | 0.11 | 99.90 | 100 | 100 | 100 |
| 11. | N-Benzyl-N,N-dimethyl-N-myristyl-ammonium dibromochloride | 034 | 100 | 100 | 100 | 100 |
| 12. | N-Ethoxyethyl-N,N,N-trimethylammonium tribromide | 0.34 | 100 | 100 | 99.90 | 100 |
| 13. | N,N-Dimethyl-N-ethyl-N-propylammonium dichlorobromide | 0.25 | 100 | 100 | 100 | 100 |
| 14. | N-Ethyl-N,N,N-trimethylammonium dichlorobromide | 0.20 | 100 | 100 | 100 | 100 |
| 15. | N,N-Didecyl-N,N-dimethyl-ammonium dibromochloride | 0.30 | 100 | 100 | 100 | 100 |

While the foregoing has been described with respect to preferred embodiments and alternatives thereto, one skilled in the art should realize that modifications and changes may be made to the foregoing while still falling within the intent and scope of the present invention. All such modifications and changes should be considered a part hereof.

We claim:

1. A biocidally active composition comprising a biocidally effective amount of a water soluble composition of a quaternary ammonium polyhalide of the formula:

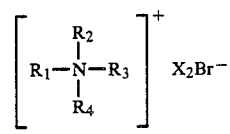

wherein each substituent $R_1$, $R_2$, $R_3$, and $R_4$ is independently selected from the group consisting of hydrogen, alkyl, alkyl ether, cyclic alkyl and hydroxyethyl; wherein said alkyl has between 1 and 10 carbon atoms, wherein at least two of the $R_1$, $R_2$, $R_3$ and $R_4$ substituents have between 8 and 10 carbon atoms; wherein no more than one of the substituents $R_1$, $R_2$, $R_3$, and $R_4$, is hydrogen; and wherein each X is independently selected from the group consisting of chlorine, bromine and iodine wherein the polyhalide is provided in admixture with an effective amount of a surfactant selected from the group consisting of poly(oxyethylene)/poly(oxypropylene) block copolymers, ethoxylated alkylphenols, phosphate esters, glycol esters, quaternary ammonium surfactants, aliphatic phosphate ester/ethylene oxide adducts and mixtures thereof, to formulate said water soluble composition.

2. A biocidally active composition, as claimed in claim 1, wherein the surfactant is provided at a level of about 40 to 95 percent by weight of the combined polyhalide-surfactant mixture.

3. The composition of claim 1, wherein the quaternary ammonium polyhalide is selected from the group consisting of N,N-dimethyl-N,N-dioctylammonium dibromochloride, N,N-didecyl-N,N-dimethylammonium dibromochloride, N,N-didecyl-N,N-dimethylammonium tribromide, and N-methyl-N,N,N-trioctylammonium dibromochloride.

* * * * *